(12) United States Patent
Rozenfeld

(10) Patent No.: US 8,742,357 B2
(45) Date of Patent: Jun. 3, 2014

(54) RADIATION SENSOR AND DOSIMETER

(75) Inventor: Anatoly Rozenfeld, Redfern (AU)

(73) Assignee: University of Wollongong, North Wollongong, NSW (AU)

( * ) Notice: Subject to any disclaimer, the term of this patent is extended or adjusted under 35 U.S.C. 154(b) by 1197 days.

(21) Appl. No.: 12/602,195

(22) PCT Filed: Jun. 2, 2008

(86) PCT No.: PCT/AU2008/000788
§ 371 (c)(1),
(2), (4) Date: Nov. 30, 2009

(87) PCT Pub. No.: WO2008/148150
PCT Pub. Date: Dec. 11, 2008

(65) Prior Publication Data
US 2010/0164534 A1    Jul. 1, 2010

(30) Foreign Application Priority Data
Jun. 4, 2007    (AU) ................ 2007903003

(51) Int. Cl.
*G01T 1/02*    (2006.01)
(52) U.S. Cl.
USPC .................. 250/370.07
(58) Field of Classification Search
USPC .................. 250/370.07
See application file for complete search history.

(56) References Cited

U.S. PATENT DOCUMENTS

| | | | |
|---|---|---|---|
| 4,976,266 A | 12/1990 | Huffman et al. | |
| 5,117,113 A * | 5/1992 | Thomson et al. | 250/370.07 |
| 5,444,254 A | 8/1995 | Thompson | |
| 6,097,033 A | 8/2000 | Brand et al. | |
| 6,222,193 B1 * | 4/2001 | Thurston et al. | 250/370.01 |
| 6,398,710 B1 * | 6/2002 | Ishikawa et al. | 600/3 |
| 6,614,025 B2 | 9/2003 | Thompson et al. | |
| 7,361,134 B2 | 4/2008 | Rozenfeld et al. | |
| 7,491,942 B2 | 2/2009 | Black et al. | |
| 2001/0032933 A1 | 10/2001 | Thompson et al. | |
| 2005/0010110 A1 | 1/2005 | Black et al. | |
| 2005/0057814 A1 | 3/2005 | Schrodinger | |

FOREIGN PATENT DOCUMENTS

WO    WO03047694    6/2003

OTHER PUBLICATIONS

International Search Report for International Application No. PCT/AU2008/000788, dated Aug. 20, 2008 (5 pages).
Written Opinion of the International Searching Authority for International Application No. PCT/AU2008/000788, dated Aug. 20, 2008 (4 pages).
Rosenfeld, A. B., "Mosfet Dosimetry on Modern Radiation Oncology Modalities," Radiation Protection Dosimetry, 2002, pp. 393-398, vol. 101, Nos. 1-4, Nuclear Technology Publishing (6 pages).

(Continued)

*Primary Examiner* — David Porta
*Assistant Examiner* — Mindy Vu
(74) *Attorney, Agent, or Firm* — The Webb Law Firm

(57) ABSTRACT

A semiconductor radiation sensor (100), comprising a substrate (102), a carrier material (104) mounted to the substrate (102), and a semiconductor detector (106) mounted to the carrier material (104). A radiation sensitive portion of the semiconductor detector (106) is oriented towards the carrier material (104) and generally away from the substrate (102), and the carrier material is adapted to transmit radiation to the radiation sensitive portion of the semiconductor detector (106). A dosimeter comprising the radiation sensor (100) and a method of manufacturing the radiation sensor (100) are also provided.

23 Claims, 5 Drawing Sheets

(56) References Cited

OTHER PUBLICATIONS

Xiang, Hong F. et al., "Build-up and Surface Dose Measurements on Phantoms Using Micro-MOSFET in 6 and 10 MV X-ray Beams and Comparisons with Monte Carlo Calculations," Medical Physics, Apr. 2007, pp. 1266-1273, vol. 34, No. 4, © 2007 Am. Assoc. Phys. Med. (8 pages).

Kinhikar, Rajesha A. et al., "Dosimetric Evaluation of a New OneDose MOSFET for Ir-192 Energy," Physics in Medicine and Biology, 2006, pages 1261-1268, vol. 51, © 2006 IOP Publishing Ltd. (8 pages).

Rosenfeld, Anatoly B. et al., "Edge-on Face-to-Face MOSFET for Synchrotron Microbeam Dosimetry: MC Modeling," IEEE Transactions on Nuclear Science, Dec. 2005, pp. 2562-2569, vol. 52, No. 6, © 2005 IEEE (9 pages).

Ramaseshan, R et al., "Performance Characteristics of a MicroMOSFET as an in vivo Dosimeter in Radiation Therapy," Physics in Medicine and Biology, 2004, pp. 4031-4048, vol. 49, © 2004 IOP Publishing Ltd. (18 pages).

Scalchi, Paolo et al., "Characterization of a New MOSFET Detector Configuration for in vivo Skin Dosimetry," Medical Physics, Jun. 2005, pp. 1571-1578, vol. 32, No. 6, © 2005 Am. Assoc. Phys. Med. (8 pages).

Butson, Martin J. et al., "A New Radiotherapy Surface Dose Detector: TheMOSFET," Medical Physics May. 1996, pp. 655-658, vol. 23, No. 5, © 1996 Am. Assoc. Phys. Med. (4 pages).

Buehler, M. G. et al., "On-Chip p-MOSFET Dosimetry," IEEE Transactions on Nuclear Science, Dec. 1993, pp. 1442-1449, vol. 40, No. 6, IEEE (8 pages).

International Preliminary Report on Patentability for Application No. PCT/AU2008/000788, dated Dec. 7, 2009 (6 pages).

\* cited by examiner

US 8,742,357 B2

RADIATION SENSOR AND DOSIMETER

RELATED APPLICATION

This application is based on and claims the benefit of the filing date of AU application no. 2007903003 filed 4 Jun. 2007, the content of which as filed is incorporated herein by reference in its entirety.

FIELD OF THE INVENTION

The present invention relates to a radiation sensor and dosimeter based thereon, of particularly but by no means exclusive application in measuring radiation dose in photon or electron fields such as for radiation medicine, including radiotherapy and radiation based diagnosis.

BACKGROUND OF THE INVENTION

Metal Oxide Semiconductor Field Effect Transistor (MOSFET) and diode sensors have been used for radiation dosimetry in radiation therapy [1] and other applications such as space and individual dosimetry. A MOSFET operates by trapping a positive charge in the gate oxide proportional to the absorbed dose deposited in a gate. The accumulating charge changes the threshold voltage of the MOSFET sensor measured under constant current [2]. The advantage of MOSFET sensors is in their thin sensitive volume-gate oxide (typically of less than 1 micron); this allows the measurement of dose patterns with high spatial resolution, which is important in Intensity Modulated Radiation Therapy (IMRT) and conformal therapy and brachytherapy. Another advantage of MOSFET detectors is their ability to accumulate dose during irradiation and retain dose information after multiple readouts, which is not possible with Thermo-Luminescent Dosimeter (TLD) detectors.

Silicon diodes for radiation dosimetry usually operate in a passive mode. The internal electric field produced by the p-n junction of the diode collects charge induced by radiation within the diffusion length in a base of the diode; this provides a short circuit current proportional to the radiation dose rate. Integration of this current provides a measure of the total dose. Usually the sensitive region of the diode is of the order of 50 microns. The simplicity and robustness of these diodes make them attractive for radiotherapy and in vivo real time dosimetry. In many applications diodes are used for entrance and exit dose measurements by placing a diode on a patient during irradiation. Both of these doses are associated with measurements at the water equivalent depth (WED) $D_{max}$ where charged particle equilibrium is achieved; this depth can be varied from 1.5 to 4 cm by changing the X-ray photon energy of 6 to 18 MV. For miniaturization of the diode sensor's build-up, different materials are used, such as Al or Cu for 1 to 4 MV photons, brass for 4 to 12 MV photons and Ti for 12 to 25 MV photons [3].

Various MOSFET dosimetry systems have been developed over the last 10 years. Important MOSFET parameters for radiation therapy dosimetry include the anisotropy of the response, insensitivity of the response to changes in ambient temperature and the ability to measure skin dose and depth dose. Dual MOSFET sensors have been proposed, to compensate for the temperature dependence of the threshold voltage; the gate voltages of an irradiated MOSFET sensor and a control MOSFET sensor with the same temperature coefficient are compared using a comparative circuit [4].

Another dosimetry probe comprises dual MOSFETs produced on a single substrate (so that they are essentially identical). During irradiation, the gates of the paired MOSFETs are biased with different positive voltages leading to different responses; a differential signal in test mode is then proportional to absorbed dose, while compensating for the temperature instability of the MOSFET [5].

In many radiation MOSFET probes including dual MOSFET probes, the MOSFET die—which is usually of the order of 1×1 mm and 0.35 to 0.5 mm thick—is placed on one end of a tail of Kapton brand polymer that has embedded copper leads whose ends act as connecting pads to which the substrate, source drain and gate of each MOSFET are wire bonded (with aluminium or gold wires). The other ends of the copper leads are connected to the socket plugged into the data reader. An epoxy envelope is applied to fix the bonding wires and to protect the MOSFET die from environmental conditions. The copper leads and epoxy result in additional response anisotropy especially with lower energy photons such as those used in HDR brachytherapy (where an Ir-192 source is used with an average photon energy of 360 keV) and in diagnostic techniques. This packaging has the additional problem that the shape of the epoxy is not reproducible, which results in a different build-up for each probe and differences in WED of about 0.7 to 1 mm [14].

MOSFET sensors for radiation therapy applications, whether passive or active, are presently provided as either disposable ("OneDose" [7]), multiuse (Thompson Nelson MOSFET system) or wirelessly powered and implantable MOSFETs for internal use; all have an epoxy envelope or other cover build up. This is less problematic for internal use when dose measurements are made inside the body (with an implantable wireless MOSFET [8]), where charged particle equilibrium exists and MOSFET response is driven mostly by high energy secondary electrons generated from surrounding tissue rather then from the epoxy. However, the epoxy and the current packaging makes it impossible to realize the full advantages of the micron thickness of the gate oxide of MOSFET dosimeters when used for skin dosimetry or inside anatomical cavities where dosimetry at the tissue-air interface is critical for Dose Planning System (DPS) verification. Comparable problems apply to diode sensors for such applications.

One technique [9] for improving the anisotropy of MOSFET detector response places the MOSFET die on the surface of a Kapton tail with the rear of the die and wire bonded to the top side (essentially as described above), but with a dummy Si die of the same thickness as the MOSFET die adjacent to the surface of the MOSFET die so as to overlay an active region of the MOSFET surface gate and surrounding area; an epoxy envelope is again used to provide mechanical fixation and protection from the environment. Sandwiching the sensitive dosimetric micron surface layer (i.e. the MOSFET gate or diode p-n junction) between two Si bulk layers makes the radiation path more isotropic. A similar approach [10] has also been suggested for edge-on MOSFET detectors for the measuring the dose deposited by narrow micron synchrotron X-ray micro-beams in Microbeam Radiation Therapy (MRT), to make scattering conditions uniform when scanning the edge-on MOSFET across the microbeam. However, this approach does not solve the problems of skin dosimetry with the MOSFET detector or diode, increasing the WED of dose measurements and leaving the problem of large WED and poor WED reproducibility due to the epoxy.

Accurate measurement of the skin dose is important in X-ray MV therapy and radiation diagnosis owing to radiation damage of basal layer of epidermis at the depth of 70 to 200 microns. It can be important to determine skin dose due to electron contamination from photon interaction in the air column between the accelerator and patient. The skin dose depends on the incident angle of the beam on the patient, the curvature of the surface of the patient; it increases with increasing beam angle of incidence and beam size, especially with tangential radiation beams in breast cancer treatment. Owing to the absence of a charged particle equilibrium on a surface of the body, the dose gradient is steep which leads to error in skin dosimetry if the WED of the MOSFET measurements is high and a loss of irreproducible within a batch of MOSFETs. Skin dose control in real time is important for avoiding radiation burns, which can lead to serious complications especially during the treatment of breast cancer.

A MOSFET has been reported [11, 14] having a round epoxy envelope as described above and a WED of 1.8 mm for measurements with a 6 MeV X-ray beam with a field size of 10×10 cm. Manual attempts to partially remove the epoxy led to a spreading of the WED in a range 0.04 to 0.15 mm in the same batch of MOSFETs [12], leading to an unacceptable lack of WED reproducibility for skin dosimetry.

Improved anisotropy of the response of the MOSFET with packaging of the type described in reference [8] nonetheless does not provide correct skin dosimetry in radiation therapy.

It has been demonstrated [13] that using a bare (unpackaged) MOSFET allows accurate measurements of dose on the surface on a phantom; this exploits the advantages of the thin dosimetric layer (viz. gate oxide) but it is impractical to leave the gate of the MOSFET unprotected against moisture and mechanical damage.

Temperature stabilization of the sensor response is commonly achieved in the background art by using dual MOSFET sensors and dual bias supplies for differentially biasing the gates of the sensors during irradiation. This technique is employed in [5].

Alternatively, a thermo-stable point on the current-voltage characteristic of the MOSFET may be identified maintained during measurements. However, the readout current corresponding to the thermo-stable point of the current-voltage characteristic is unique for any particular MOSFET and can vary from one batch to another [14].

SUMMARY OF THE INVENTION

According to a first broad aspect, the present invention provides a semiconductor radiation sensor, comprising:
 a substrate;
 a carrier material mounted to the substrate; and
 a semiconductor detector mounted to the carrier material;
 wherein a radiation sensitive portion of the semiconductor detector is oriented towards the carrier material and generally away from the substrate, and the carrier material is adapted to transmit radiation to the radiation sensitive portion of the semiconductor detector.

Thus, the carrier material covers and protects the radiation sensitive portion of the semiconductor detector.

The sensor will usually be provided with electrical connectors coupled to the semiconductor detector.

Sensors according to this aspect can be small in size and hence may be located in, for example, narrow catheters or body cavities for monitoring radiation dose or dose rate in vivo in real time, including during a medical procedure. A physically or wirelessly connected electronic reader may be employed as a data collector to collect the data.

The carrier material preferably comprises a flexible polymeric material, such as a polyamide.

The substrate may include an aperture (or a recess) for receiving a rear portion of the semiconductor detector. The rear portion may be covered with an epoxy material.

The carrier material and semiconductor detector may be coated at least partially with a polyamide or other polymeric material.

The semiconductor detector may comprise a planar diode or MOSFET die.

According to this aspect, there is also provided a radiation sensor, comprising:
 a carrier material mountable to a substrate; and
 a semiconductor detector mounted to the carrier material;
 wherein a radiation sensitive portion of the semiconductor detector is oriented towards the carrier material and generally away from the substrate, and the carrier material is adapted to transmit radiation to the radiation sensitive portion of the semiconductor detector.

According to another aspect of the invention, there is provided a dosimeter comprising a radiation sensor as described above.

According to still another aspect of the invention, there is provided a method of manufacturing a radiation sensor, comprising:
 mounting a semiconductor detector to a carrier material with a radiation sensitive portion of the semiconductor detector oriented towards the carrier material, said carrier material being adapted to transmit radiation to the radiation sensitive portion of the semiconductor detector; and
 mounting the carrier material on a substrate with the radiation sensitive portion of the semiconductor detector directed generally away from the substrate.

According to yet another aspect of the invention, there is provided a method for thermo-stabilizing a semiconductor detector (such as a MOSFET or diode sensor), comprising correcting threshold voltage drift arising owing to temperature changes according to the forward drop voltage of the source-substrate p-n junction.

In one embodiment, the method comprises biasing a substrate of the semiconductor detector relative to the source to provide a substantially constant current for the p-n junction;
 scaling and sampling the change in the voltage drop across the source-substrate p-n junction (such as by scaling the change in the voltage drop across the source-substrate p-n junction, then sampling the scaled change in the voltage drop); and
 subtracting the scaled change in the voltage drop from the threshold voltage during each readout cycle.

The method may further comprise converting the measured change in threshold voltage to dose using a predetermined calibration (such as a calibration curve) or a look-up table.

In another embodiment, the method comprises:
 selecting a forward current through the forward biased p-n junction such that the change in the voltage drop across the source-substrate p-n junction with changing temperature may be used to control the threshold voltage though the substrate of the semiconductor detector.

As will be understood by those skilled in the art, each of the optional features of the above aspects of the invention may be employed where suitable in any combination with the other optional features and with any other aspect of the invention.

BRIEF DESCRIPTION OF THE DRAWING

In order that the invention may be more clearly ascertained, embodiments will now be described, by way of example, with reference to the accompanying drawing, in which.

DETAILED DESCRIPTION

Figure 1:
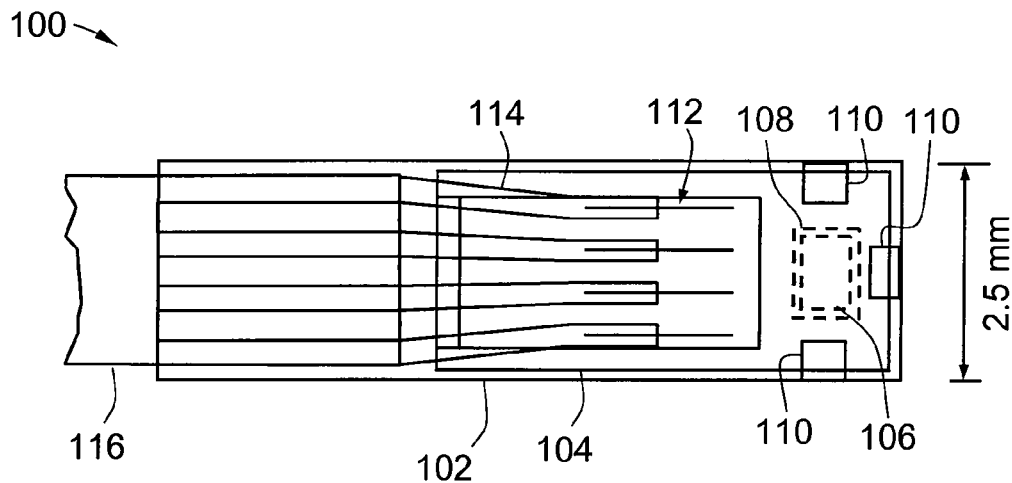
FIG. 1 is a plan schematic view of a radiation sensor according to an embodiment of the present invention.
Figure 2:
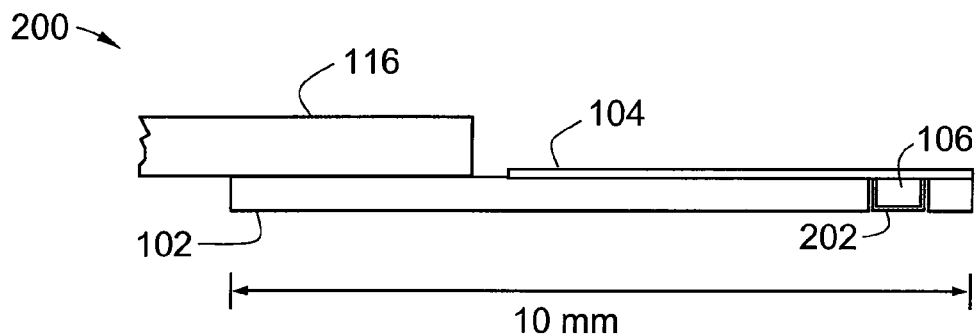
FIG. 2 is an elevational schematic view of the radiation sensor of FIG. 1.

FIGS. 1 and 2 are plan and elevational schematic views respectively of a radiation sensor 100 according to an embodiment of the present invention. The sensor 100 is designed for use in a dosimetry system that is suitable for skin and internal real time in vivo dosimetry in radiation therapy (including HDR brachytherapy), where reproducible skin dose measurements with WED prescribed by ICRU [14] are required, and for temperature independent internal dosimetry with minimal MOSFET probe anisotropy.

Sensor 100 includes a tissue equivalent (or close to tissue equivalent) substrate 102 (10×2.5 mm and 0.38 mm thick) of—in this embodiment—ceramic material, which provides mechanical rigidity. Sensor 100 also includes a flexible polyamide carrier 104 (of 0.02 mm thickness) located on substrate 102, and a MOSFET chip or "die" 106 mounted to—but under—carrier 104 (so is shown in ghost in FIG. 1), and protruding into a rectangular aperture 108 in substrate 102.

Substrate 102 can, in other embodiments, be of other dimensions as required, including having a length of less than 10 mm where desired. The thickness of substrate 102 is selected to accommodate MOSFET die 106. A thin layer of epoxy 202 is used to cover the rear of MOSFET die 106 and fix the MOSFET die in aperture 108. As discussed above, the active area of the MOSFET die (viz. the gate oxide) faces upwards but is covered, and hence protected, by a thin layer of polyamide film in the form of a portion of carrier 104.

The carrier 104 is attached to the substrate 102 by ultrasonic welding at three spots 110 adjacent to aperture 108 (to pre-deposited aluminium pads), so that MOSFET die 106 remains securely located relative to the substrate 102. Aperture 108 is sized to accommodate the rear of the MOSFET die; the die has dimensions of 0.8×0.6 mm and a thickness (i.e. in the vertical direction in the view of FIG. 2) of between 150 and 350 μm. In some other embodiments, however, the die is of greater thickness, in some cases up to 500 μm with substrate 102 having a comparable thickness.

In another embodiment, a planar diode is employed rather than the MOSFET die 106. In some embodiments, the substrate 102 may instead be of Kapton brand polymer.

The sensor 100 includes four thin elongate aluminium connecting strips (shown schematically at 112) above carrier 104 that are electrically coupled to the MOSFET die 106; carrier 104 is thus between substrate 102 and aluminium strips 112. These aluminium strips 112 provide the required electrical connection to the MOSFET die 106, as is described in greater detail below. Carrier 104 thus acts both as a protective tissue equivalent layer of fixed and reproducible thickness above the MOSFET gate, and as a carrier of the aluminium strips 112.

Figure 5:
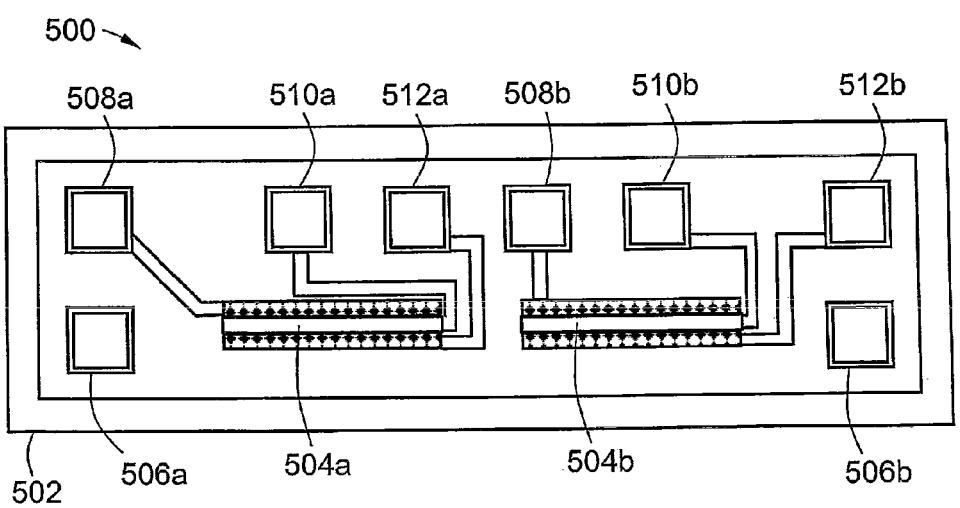
FIG. 5 is a schematic view of a dual-MOSFET MOSFET die adapted for use in a radiation sensor according to another embodiment of the present invention.

If a dual MOSFET is employed, sensor 100 will include additional aluminium connecting strips (cf. FIG. 5).

Figure 4:
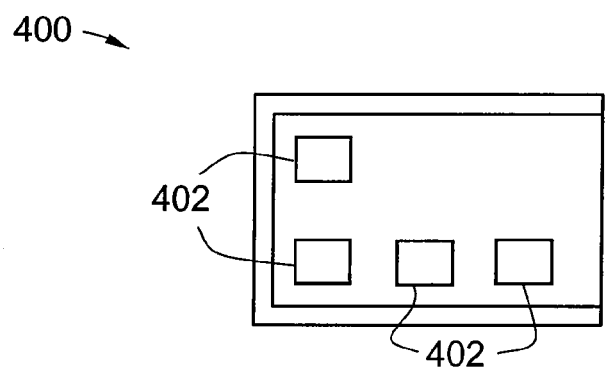
FIG. 4 is a schematic view of the MOSFET die of the radiation sensor of FIG. 1, with contact pads corresponding to source, gate, drain and substrate.
Figures 3A, 3B:
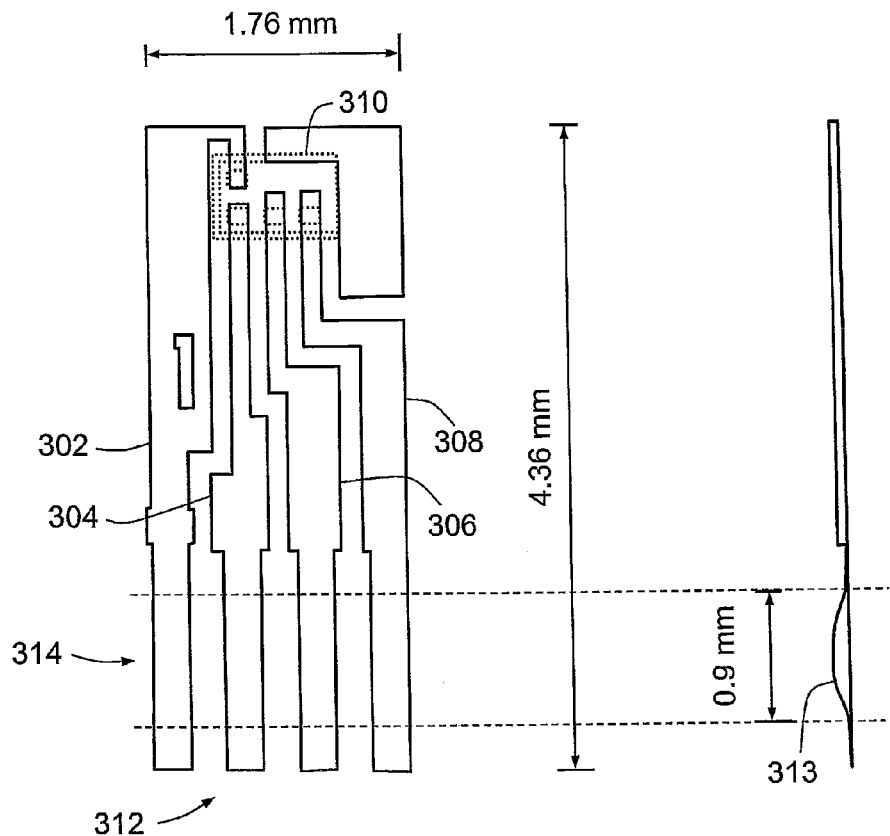
FIG. 3A is a plan view of the aluminium connecting strips of the radiation sensor of FIG. 1, in use located above the polyamide flexible carrier of the radiation sensor.
FIG. 3B is an side view of the aluminium connecting strips of FIG. 3A.

FIGS. 3A and 3B are plan and elevational views of aluminium strips 112, identified separately at 302, 304, 306, 308. These strips have a thickness of 0.02 mm. Shown in ghost at 310 is the front of MOSFET die 106 (located, in sensor 100, below the aluminium strips 302, 304, 306, 308 and separated therefrom by carrier 104), including its four aluminium contact pads. FIG. 4 is an enlarged view of the front 400 of MOSFET die 106 including these contact pads 402, including substrate, source, gate and drain pads. In embodiments that include a planar diode rather than a MOSFET die, electrical contact is made with the cathode and anode of the diode die.

Carrier 104 includes four apertures (not shown) that coincide with the positions of the contact pads 402 so that electrical contact can be made between the aluminium strips and the contact pads 402 of MOSFET die 106.

Aluminium strips 302, 304, 306, 308 may be attached to the contact pads 402 of the MOSFET die 106 by ultrasound welding. The aluminium strips 302, 304, 306, 308, however, do not cover the sensitive area of the MOSFET gate, which avoids dose enhancement effects from electron scattered from the aluminium.

The ends 312 of the aluminium strips remote from the MOSFET die 106 are provided with soldering balls 313 located in a mounting zone 314 of each strip, and are connected (by ultrasound welding) to connecting copper wires or strips 114 deposited on —or alternatively embedded in —substrate 102; copper strips 114 are connected either to a plug (in the case of a disposable MOSFET) or a ribbon cable (in the case of multi-use MOSFET). This embodiment has the latter: sensor 100 includes a ribbon cable 116, which is connected to copper strips 114.

This arrangement provides a flat reproducible mount and protects the sensor 100 from environmental hazards. The thickness of the mount can be adjusted to reproduce a required WED by laminating the sensor with an additional polyamide of desired thickness; such lamination also provides a water- or moisture-proof envelope. The result is a sensor that has the form of a planar strip with a width of 1.8 to 2.5 mm, a thickness of 0.4 mm (though in some variants of this embodiment up to 0.5 mm) and a length of 10 mm (though this can be varied as desired, and it is envisaged that the sensor will commonly be shorter).

In another embodiment, the sensor includes a MOSFET die with two MOSFETs, each with a different gate oxide thickness and hence sensitivity. FIG. 5 illustrates such a MOSFET die schematically at 500. MOSFET die 500 includes a substrate 502, a first transistor 504a with a relatively thin oxide layer and a second transistor 504b with a relatively thick oxide layer. The die 500 includes aluminium substrate, source, gate and drain connection pads 506a, 508a, 510a, 512a for first transistor 504a and aluminium substrate, source, gate and drain connection pads 506b, 508b, 510b, 512b for second transistor 504b.

The die has a size of 0.55×1.7 mm and a thickness comparable to that of MOSFET die 106 of FIGS. 1 and 2 (which is essentially that half of die 500 with second transistor 504b).

EXAMPLES

Figure 6:
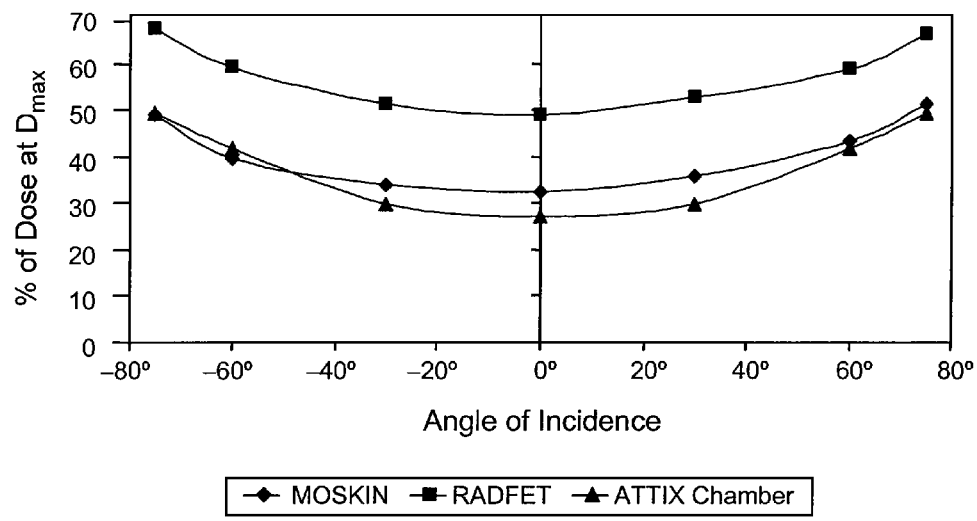
FIG. 6 plots skin dose measured i) with the radiation sensor of FIG. 1, ii) with a radiation sensor of the background art, and iii) with an ATTIX plane parallel ionization chamber under the same conditions for different incident angles and 6 MeV radiation from a LINAC.

FIG. 6 is a plot showing the angular dependence of the measured surface dose as a percentage of depth dose at $D_{max}$ with two MOSFET sensors, one according to the embodiment of FIGS. 1 to 4 (termed "MOSKIN" (trade mark)) and a "RADFET" MOSFET sensor of the background art (with a covering epoxy envelope), with a radiation field of 20×20 cm$^2$ from a 6 MV LINAC and SSD=100 cm. The plot compares these data with results from an ATTIX plane parallel ionization chamber (the "gold standard" for such determinations), which measures surface dose. It is apparent that the MOSKIN response is close to the ATTIX ionizing chamber over a wide angular range of the incident beam on the surface of the solid water phantom, bearing in mind that the WED in the ATTIX measurements was less than that of the MOSKIN measurements. The WED of the measurements with this particular MOSKIN sensor was 0.12 mm and for the RADFET sensor with epoxy bubble about 1 mm.

Figure 7:
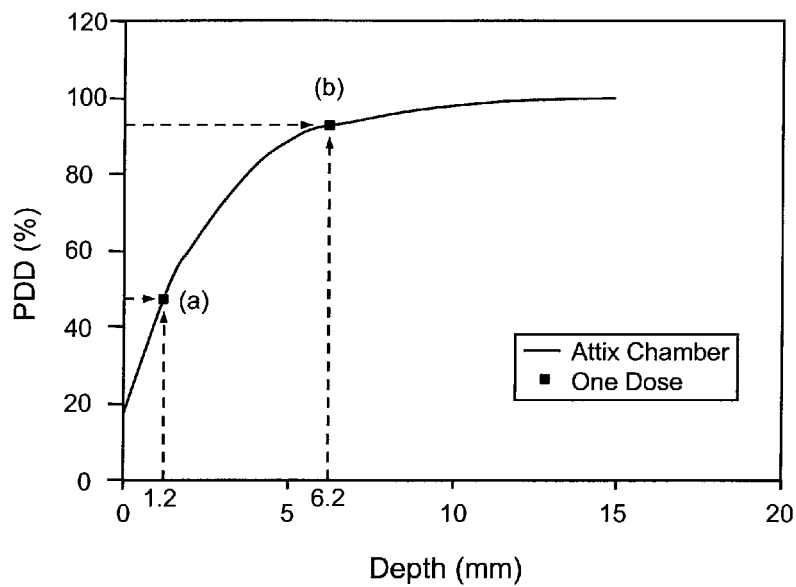
FIG. 7 is a plot of the response of a OneDose brand single use MOSFET sensor with epoxy bubble of the background art located (a) on the surface of, and (b) at a depth of 5 mm in, a solid water phantom, superimposed on the response of an ATTIX chamber under the same conditions of normal incidence of the 6 MV X-ray beam.

FIG. 7 is a plot of the response of a OneDose brand single use MOSFET sensor with epoxy bubble placed on the surface and at a depth of 5 cm in a solid water phantom, superimposed on the response of an ATTIX chamber under the same conditions (i.e. 10×10 cm$^2$ radiation field, 6 MV LINAC and SSD=100 cm). The OneDose brand sensor—when placed on the surface—measures dose at a depth of 1.2 mm (data point (a)), that is, 10 times deeper than depth of clinical interest; the same 1.2 mm depth offset is observed at a depth of 5 cm (data point (b)).

Figure 8:
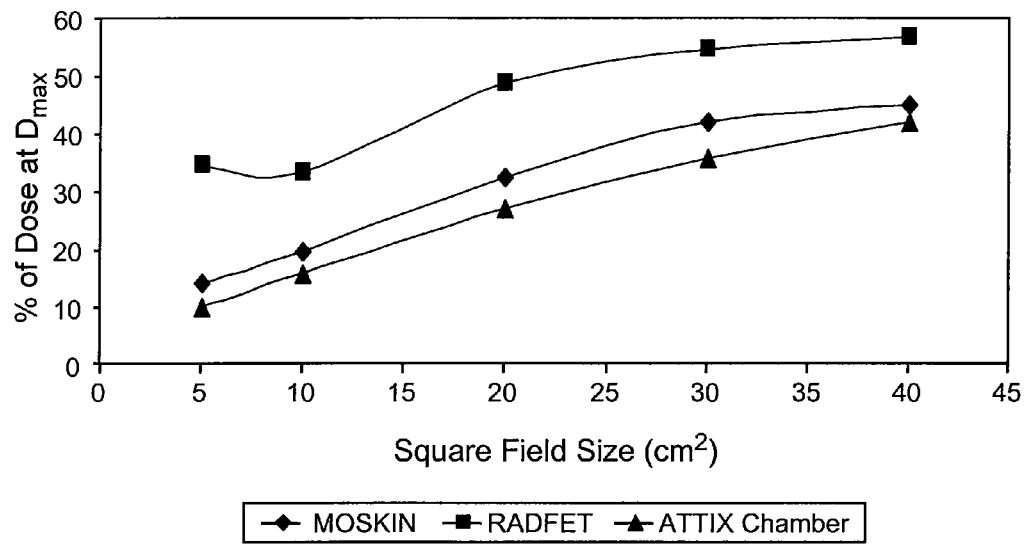
FIG. 8 plots measured surface dose as a percentage of depth dose at $D_{max}$ for different field size obtained i) with the radiation sensor of FIG. 1, ii) with a radiation sensor of the background art containing epoxy bubble above sensitive volume of the detector, and iii) with an ATTIX plane parallel ionization chamber under the same conditions of the normal incidence of 6MV X-ray beam.

FIG. 8 is a plot of skin dose measured by MOSKIN, RADFET with epoxy bubble and ATTIX ionizing chamber for field sizes from 5 to 40 cm$^2$ at normal beam incidence. It is apparent that the MOSKIN sensor provides reliable skin dose measurements at a depth of 0.12 mm for all radiation fields used in radiation therapy, while the epoxy covered RADFET sensor overestimates the skin dose by as much as a factor of two or more.

Figure 9:
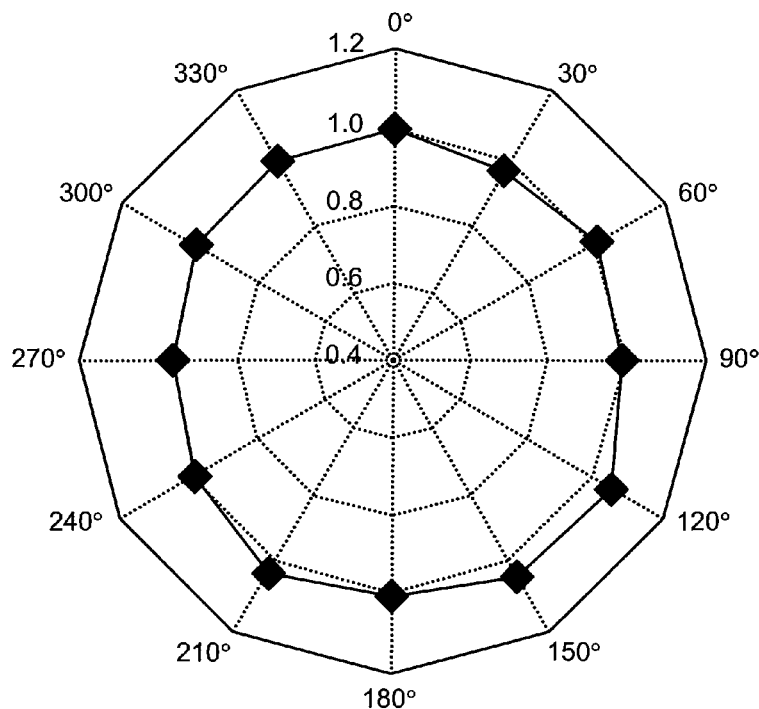
FIG. 9 is a plot of the angular response of the radiation sensor of FIG. 1 in a solid water phantom at a distance of 18 mm from an Ir-192 source.

The MOSKIN sensor also has more uniform angular response, which is especially important for lower energy photons as employed in HDR brachytherapy (the average energy of an Ir-192 source being about 360 keV): FIG. 9 is a plot of the angular response of the MOSKIN sensor in a solid water phantom at a distance of 18 mm from an Ir-192 source. The MOSKIN sensor exhibits an anisotropy of generally within ±2%.

Temperature Stabilization of Sensor Response

According to the present invention, thermo-stabilization is achieved using the source-substrate p-n junction of the same MOSFET sensor during readout mode of the threshold voltage on the MOSFET sensor.

Figure 10:
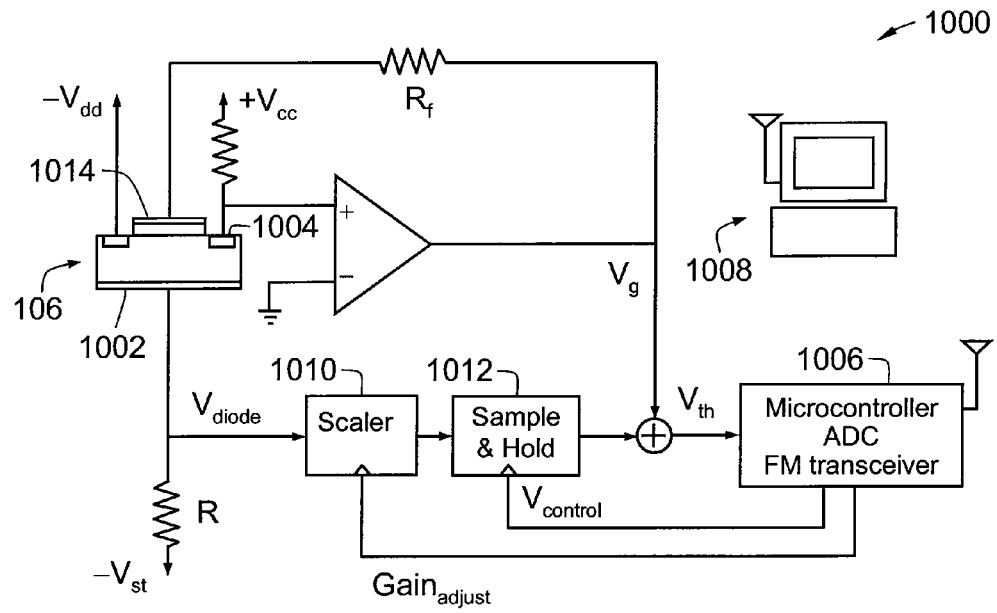
FIG. 10 is a diagram of a MOSFET threshold voltage thereto-stabilization circuit according to the embodiment of FIG. 1.

FIG. 10 is a diagram of a MOSFET threshold voltage thermo-stabilization circuit 1000 according to this embodiment. The circuit 1000 operates by using the forward drop voltage of the source-substrate p-n junction, which is a function of the temperature inside the MOSFET die 106, to correct the $V_{th}$ drift arising from temperature changes. To do so, the substrate 1002 of the MOSFET die 106 of the sensor 100 is biased through a resistor R with a potential of $-V_{st}$ relative to the source 1004, which is under virtually zero bias, to provide constant current for the p-n junction. The change in the voltage drop across the source-substrate p-n junction is scaled, sampled and subtracted from the threshold voltage $V_{th}$ during each readout cycle in a microprocessor controlled reader 1006, which also converts the measured $V_{th}$ to dose and wirelessly transmits the dose to a data collection computer 1008.

Alternatively, if the proper forward current through the forward biased p-n junction is selected, the change in the voltage drop across the source-substrate p-n junction with changing temperature may be used to control $V_{th}$ though the substrate 1002. In this case a feedback loop is created inside the MOSFET die 106 so the Scaler 1010 and the Sample & Hold module 1012 of the circuit of FIG. 10 are not required.

Figure 11:
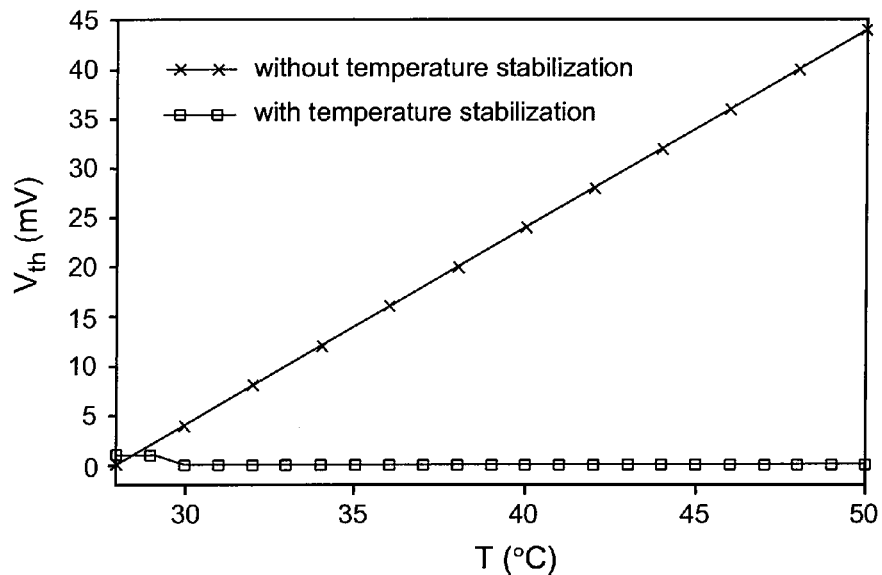
FIG. 11 is a plot of the relationship between threshold voltage $V_{th}$ (mV) and temperature T (° C.) in a p-MOSFET sensor, both with and without thermo-stabilization according to the embodiment of FIG. 10.

FIG. 11 is a plot of the relationship between threshold voltage $V_{th}$ (mV) and temperature T (° C.) in a p-MOSFET sensor, for a read-out current of 150 µA, without thermo-stabilization (crosses) and with thermo-stabilization provided with the circuit of FIG. 10 (squares). Threshold voltage $V_{th}$ changes negligibly between 30° C. and 50° C.

The advantage of this approach is its simplicity, due to the direct probing of the temperature in the MOSFET die 106 close to the gate 1014. This makes it applicable to essentially any MOSFET sensor.

Conclusion

Thus, the sensor 100 has the following key features and advantages:

i) Sensor 100 employs a "drop in" packaging with electrical connections and mechanical fixation of MOSFET die 106 provided from the top side of the die;

ii) Aluminium strips 302, 304, 306, 308 connect the aluminium substrate, source, gate and drain pads of MOSFET die 106 through holes in flexible polyamide carrier 104;

iii) Polyamide carrier 104 protects the top side of the MOSFET die (and hence the sensitive element, the gate, of the MOSFET) and simultaneously provides a reproducible mount thickness with a WED of 0.12 mm (corresponding to the skin dose where basal layer of epidermis is situated);

iv) Substrate 102 (of Kapton or ceramic) has an aperture into which the MOSFET die is "dropped in" and connecting copper strips for connection to the end of the aluminium strips;

v) A laminate of polyamide or other TE material is used to provide a final adjustment of the WED and to render the sensor waterproof or resistant;

vi) The source-substrate p-n junction of the MOSFET die 106 is used for thermo-stabilization of the threshold voltage $V_{th}$ to avoid error in dosimetry associated with temperature changes; and vi) A wireless reader 1006 converts the measured $V_{th}$ to the dose.

References

[1]. A. B. Rosenfeld (invited paper), "MOSFET dosimetry in modern radiation oncology modalities", Rad. Prot. Dosim, 101(1) (2002) 393-398.
[2]. A. Holmes-Siedle, "The Space-Charge Dosimeter", Nucl. Instr. and Meth., 121 (1974) 169-179.
[3]. http://www.sunnuclear.com.
[4]. U.S. Pat. No. 4,976,266 (Huffman et al.).
[5]. U.S. Pat. No. 5,444,254 (Thompson).
[6]. Hong F. Xiang et al., "Build up and surface dose measurements on phantoms using micro-MOSFET in 6 and 10 MV x-ray beams and comparisons with Monte Carlo calculations", Med. Phys., 34(4) (2007) 1266-1273.
[7]. R. A. Kinhikar et al., "Dosimetric evaluation of a new OneDose MOSFET for Ir-192 energy", Phys. Med. Biol., 51 (2006) 1261-1268.
[8]. U.S. Patent Application Publication No. 2005/0010110 (Black et al.), published 13 Jan. 2005.
[9]. U.S. Patent Application Publication No. 2001/0032933 (Thompson and Hartshorn), published 25 Oct. 2001.
[10]. A. B. Rosenfeld, E. A. Siegbahn, E. Brauer-Krish, A. Holmes-Siedle, M. L. F. Lerch, A. Bravin, I. M. Cornelius, G. J. Takacs, N. Painuly, H. Nettelback, T. Kron, "Edge on Face-to-Face (EOFF) MOSFET for Synchrotron Microbeam Dosimetry: MC modeling", IEEE Trans on Nucl. Sci., 52 (2005) 2562-2569.
[11]. Ramaseshan et al., "Performance characteristics of a microMOSFET as an in vivo dosimeter in radiation therapy", Phys. Med. Biol., 49 (2004) 4031-4048.
[12]. Scalchi et al., "Characterization of a new MOSFET detector configuration for in vivo skin dosimetry" Med. Phys., 32(6) (2005) 1571-1578.
[13]. M. Butson, A. Rozenfeld, J. Mathur, M. Carolan, T. Wong, P. Metcalfe, "A new radiotherapy surface dose detector: the MOSFET", Med. Phys. 23(5) (1996) 655-658.
[14]. M. G. Buehler, B. R. Blaes, G. A. Soli, G. R. Tradio, "On-chip p-MOSFET dosimetry", IEEE Trans. On Nucl. Sci., 40(6) (1993) 14442-14449.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in Australia or any other country.

The claims defining the invention are as follows:

1. A semiconductor radiation sensor, comprising:
a substrate;
a carrier material mounted to said substrate;
conducting leads mounted on a first side of said carrier material; and
a semiconductor detector electrically coupled to the conducting leads and mounted to a second side of said carrier material, such that the substrate and the semiconductor detector are located on the second side of the carrier material;
wherein the substrate has an aperture or recess, the semiconductor detector protrudes at least partially into the aperture or recess, a radiation sensitive portion of said semiconductor detector is oriented towards said second side of the carrier material, and said carrier material is adapted to transmit radiation of interest to said radiation sensitive portion of said semiconductor detector.

2. A sensor as claimed in claim 1, wherein said sensor is adapted for use within a narrow catheter or a body cavity or on a body surface, for monitoring radiation dose or dose rate in vivo.

3. A sensor as claimed in claim 1, wherein said sensor is adapted for physical or wireless data connection to an electronic data collector.

4. A sensor as claimed in claim 1, wherein said carrier material comprises a flexible polymeric material.

5. A sensor as claimed in claim 1, wherein said carrier material comprises a polyamide.

6. A sensor as claimed in claim 1, wherein a rear portion of said semiconductor detector is covered with an epoxy or other tissue equivalent material.

7. A sensor as claimed in claim 1, wherein said carrier material provided with said conducting leads and semiconductor detector are coated at least partially with a polyamide or other polymeric material.

8. A sensor as claimed in claim 1, wherein said semiconductor detector comprises a planar diode or MOSFET die.

9. A sensor as claimed in 1, wherein the conducting leads are connected to contact pads of the semiconductor detector through apertures in the carrier material such that the conducting leads do not overlay the radiation sensitive portion of the semiconductor detector.

10. A sensor as claimed in 1, wherein the carrier material is a tissue equivalent material.

11. A radiation sensor, comprising:
a semiconductor detector carrier material;
conducting leads mounted on a first side of said carrier material; and
a semiconductor detector electrically coupled to the conducting leads and mounted to a second side of said carrier material with a radiation sensitive portion of said semiconductor detector oriented towards said carrier material;
wherein said carrier material is adapted to be mounted to a substrate with said substrate located on the second side of the carrier material and with said semiconductor detector protruding at least partially into an aperture or recess in said substrate, and said carrier material is adapted to transmit radiation of interest to said radiation sensitive portion of said semiconductor detector.

12. A sensor as claimed in claim 11, wherein said semiconductor detector carrier comprises a flexible polymeric material.

13. A sensor as claimed in claim 11, wherein said semiconductor detector carrier provided with said conducting leads and said semiconductor detector are coated at least partially with a polyamide or other polymeric material.

14. A sensor as claimed in claim 11, wherein said semiconductor detector comprises a planar diode or MOSFET die.

15. A dosimeter comprising a radiation sensor as claimed in claims 1 or 11.

16. A sensor as claimed in claim 11, wherein the conducting leads are connected to contact pads of the semiconductor detector through apertures in the carrier material such that the conducting leads do not overlay the radiation sensitive portion of the semiconductor detector.

17. A sensor as claimed in 11, wherein the carrier material is a tissue equivalent material.

18. A method of manufacturing a radiation sensor, comprising:
- mounting conducting leads on a first side of a carrier material;
- mounting a semiconductor detector to a second side of the carrier material with a radiation sensitive portion of said semiconductor detector oriented towards said carrier material, said carrier material being adapted to transmit radiation of interest to said radiation sensitive portion of said semiconductor detector;
- electrically coupling the semiconductor detector to the conducting leads; and
- mounting said carrier material on a substrate that has an aperture or recess, such that said semiconductor detector protrudes at least partially into said aperture or recess and the substrate is located on the second side of said carrier material.

19. A method as claimed in claim 18, including forming said carrier material from a flexible polymeric material.

20. A method as claimed in claim 18, including coating said carrier material provided with said conducting leads and semiconductor detector at least partially with a polyamide or other polymeric material.

21. A method as claimed in claim 18, wherein said semiconductor detector comprises a planar diode or MOSFET die.

22. A method as claimed in 18, including connecting the conducting leads to contact pads of the semiconductor detector through apertures in the carrier material such that the conducting leads do not overlay the radiation sensitive portion of the semiconductor detector.

23. A method as claimed in 18, wherein the carrier material is a tissue equivalent material.

\* \* \* \* \*